United States Patent
Kim et al.

(10) Patent No.: US 7,824,813 B2
(45) Date of Patent: Nov. 2, 2010

(54) FUEL REFORMING SYSTEM HAVING MOVABLE HEAT SOURCE AND FUEL CELL SYSTEM COMPRISING THE SAME

(75) Inventors: Ju Yong Kim, Seoul (KR); Sung Chul Lee, Yongin (KR); Chan Ho Lee, Yongin (KR); Dong Myung Suh, Yongin (KR); Jin Kwang Kim, Yongin (KR); Jin Goo Ahn, Yongin (KR); Dong Uk Lee, Yongin (KR)

(73) Assignee: Samsung SDI Co., Ltd., Yongin-si (KR)

( * ) Notice: Subject to any disclaimer, the term of this patent is extended or adjusted under 35 U.S.C. 154(b) by 930 days.

(21) Appl. No.: 11/653,657

(22) Filed: Jan. 12, 2007

(65) Prior Publication Data

US 2007/0166580 A1    Jul. 19, 2007

(30) Foreign Application Priority Data

Jan. 17, 2006    (KR) .................. 10-2006-0005088

(51) Int. Cl.
*H01M 8/06* (2006.01)
*H01M 8/04* (2006.01)

(52) U.S. Cl. .................. 429/423; 429/416; 429/434; 429/436

(58) Field of Classification Search .................. 429/19, 429/20, 26, 12
See application file for complete search history.

(56) References Cited

U.S. PATENT DOCUMENTS 4,552,741 A    11/1985   Melchior 6,183,895 B1    2/2001   Kudo et al.

(Continued)

FOREIGN PATENT DOCUMENTS

CA    2 553 406 A1    8/2005

(Continued)

OTHER PUBLICATIONS

Korean Patent Abstracts, Publication No. 1020000022545 A; Publication Date: Apr. 25, 2000; in the name of Aeachi et al.

(Continued)

*Primary Examiner*—Patrick Ryan
*Assistant Examiner*—Julian Mercado
(74) *Attorney, Agent, or Firm*—Christie, Parker & Hale, LLP

(57) ABSTRACT

A fuel reforming system and a fuel cell system including the same, the fuel reforming system including: a fuel reformer adapted to produce a reformed gas having hydrogen as a main component from a fuel containing hydrogen; a carbon monoxide (CO) remover adapted to remove carbon monoxide from the reformed gas; a heat source adapted to supply heat energy to the reformer and the CO remover; and a moving unit adapted to move the heat source between the fuel reformer and the CO remover. With this configuration, the fuel reformer and the CO remover can be directly heated by a heat source. Then, when the temperature of the CO remover reaches a catalyst activation temperature, the heat source can be moved to directly heat only the fuel reformer, thereby enhancing a reforming effect and a power generation efficiency of the fuel reforming system.

22 Claims, 4 Drawing Sheets

U.S. PATENT DOCUMENTS

| | | | |
|---|---|---|---|
| 6,238,815 B1 * | 5/2001 | Skala et al. | ................... 429/17 |
| 6,413,479 B1 | 7/2002 | Kudo et al. | |
| 2002/0062943 A1 | 5/2002 | Kondo et al. | |

FOREIGN PATENT DOCUMENTS

| EP | 0 931 585 A1 | 7/1999 |
|---|---|---|
| JP | 2002-121004 | 4/2002 |
| JP | 2005-5011 | 1/2005 |
| JP | 2005-530673 | 10/2005 |
| KR | 2000-0022545 | 4/2000 |
| KR | 2000-0022546 | 4/2000 |

OTHER PUBLICATIONS

Korean Patent Abstracts, Publication No. 1020000022546 A; Publication Date: Apr. 25, 2000; in the name of Kudo et al.

Patent Abstracts of Japan, Publication Number: 2005-005011; Publication Date: Jan. 6, 2005; in the name of Katsuki Yagi et al.

European Search Report dated May 14, 2007, for corresponding European Patent Application No. 07100531.8-2119.

Japanese Office action dated Oct. 27, 2009, for corresponding Japanese application 2006-300813, noting listed references in this IDS, as well as JP 2005-005011, previously filed in an IDS dated Aug. 8, 2007.

* cited by examiner

… (1)

FUEL REFORMING SYSTEM HAVING MOVABLE HEAT SOURCE AND FUEL CELL SYSTEM COMPRISING THE SAME

CROSS-REFERENCE TO RELATED APPLICATION

This application claims priority to and the benefit of Korean Patent Application No. 10-2006-0005088, filed on Jan. 17, 2006, in the Korean Intellectual Property Office, the entire content of which is incorporated herein by reference.

BACKGROUND

1. Field of the Invention

The present invention relates to a fuel reforming system for reforming fuel (e.g., butane) and producing reformed gas rich in hydrogen, and fuel cell system including the same, and more particularly, to a fuel reforming system and a fuel cell system including the same, in which a heat source is movable to provide heat energy to a reaction region for producing reformed gas with a hydrogen base.

2. Discussion of Related Art

A fuel cell system generates electric energy through a chemical reaction between oxygen and hydrogen or between oxygen and reformed gas (rich in hydrogen). The reformed gas is obtained from a fuel containing hydrogen that includes an alcoholic fuel such as methanol, ethanol, etc.; a hydrocarbonaceous fuel such as methane, propane, butane, etc.; or a natural gas fuel such as liquefied natural gas, etc.

The fuel cell system can be classified into a phosphoric acid fuel cell (PAFC), a molten carbon fuel cell (MCFC), a solid oxide fuel cell (SOFC), a polymer electrolyte membrane fuel cell (PEMFC), an alkaline fuel cell (AFC), etc., according to kinds of electrolytes used. Further, the fuel cell system can be applied to various fields such as mobile devices, transportation devices, distributed power sources, etc. according to kinds of fuels, driving temperatures, output ranges, etc.

Recently, a fuel cell system has been developed that uses a butane fuel contained in a standard portable container on the market as a fuel source.

Referring to FIG. 6, an example of such a fuel cell system is disclosed in U.S. Pat. No. 6,183,895. Here, the fuel cell system includes fuel supplying device 12 having a portable pressure container 1 containing butane gas and parts 2 (pressure container receiver) and 3 (evaporator) adapted to adjust the amount of butane gas and to control flux of the butane gas, a reformer 4 using a portion of the butane gas contained in the pressure container 1 as fuel gas of a combustor and reacting another portion of the butane gas with water to produce reformed gas containing hydrogen-rich gas, a carbon monoxide (CO) eliminator 5 adapted to decrease the concentration of carbon monoxide in the reformed gas, a fuel cell 6 using hydrogen in the reformed gas and oxygen in air to generate electricity, and an inverter 21 carrying out stable conversion from direct current to direct current or from direct current to alternating current. However, in the reformer 4 of this fuel cell system, a reaction region of the reformer 4 for obtaining the reformed gas rich in hydrogen from the butane gas is not effectively heated, resulting in a relatively low reforming efficiency.

Referring to FIG. 7, a reformer is disclosed in U.S. Pat. No. 6,413,479. Here, the reformer includes a raw material reformer part that directly receives reaction heat from a heat source so as to steam-reform a reforming fuel to thus produce reformed gas rich in hydrogen, and a shift reaction part and a carbon monoxide (CO) oxidation part, which are indirectly heated by electric heat transferred from the heat source. However, in this reformer, the shift reaction part is indirectly heated, so that it takes a relatively long time to supply sufficient heat needed for reaction processes.

SUMMARY OF THE INVENTION

Accordingly, it is an aspect of the present invention to provide a fuel reforming system in which a fuel reformer (e.g., a reforming reaction unit or a fuel reforming part) and a shift reaction part obtain reformed gas rich in hydrogen from butane gas (and low in carbon monoxide). Here, the fuel reformer and the shift reaction part are directly heated by a heat source, and then the heat source is moved to directly heat only (or moved toward) the fuel reformer when the shift reaction part reaches a catalyst activation temperature, thereby enhancing a reforming effect.

Another aspect of the present invention is to provide a fuel cell system including a fuel reforming system in which a heat source is movable to directly heat only (or is movable to be toward) a reaction region of a fuel reformer when a reaction region of a shift reaction part reaches a catalyst activation temperature (or a predetermined catalyst activation temperature) while the reaction region of the fuel reformer and the reaction region of the shift reaction part are initially and directly heated by the heat source.

An embodiment of the present invention provides a fuel reforming system including the fuel reforming system including: a fuel reformer adapted to produce a reformed gas having hydrogen as a main component from a fuel containing hydrogen; a carbon monoxide (CO) remover adapted to remove carbon monoxide from the reformed gas; a heat source adapted to supply heat energy to the fuel reformer and the CO remover; and a moving unit adapted to move the heat source between the fuel reformer and the CO remover. With this configuration, the fuel reformer and the CO remover can be directly heated by the heat source. Then, when the temperature of the CO remover reaches a catalyst activation temperature, the heat source can be moved to directly heat only the fuel reformer, thereby enhancing a reforming effect and a power generation efficiency of the fuel reforming system.

According to one embodiment of the invention, the CO remover includes a shift reaction unit having a shift catalyst adapted to reduce concentration of carbon monoxide in the reformed gas by a water gas shift reaction, and a carbon monoxide (CO) oxidation unit having an oxidation catalyst adapted to selectively oxidize and remove carbon monoxide. Further, in one embodiment, the heat source moves toward the fuel reformer when the shift reaction unit is heated to have an activation temperature of the shift catalyst.

According to one embodiment of the invention, the fuel reforming system further includes a housing having an accommodating space adapted to accommodate the fuel reformer and the shift reaction unit, and the heat source is placed behind (or at a rear side of) the shift reaction unit and orients a flame thereof toward the fuel reformer within the housing. Further, in one embodiment, the accommodating space of the housing is provided with a vaporizer that is placed in front of the fuel reformer in a direction of the flame.

Another embodiment of the present invention provides a fuel cell system including: a supplying source adapted to supply a fuel containing hydrogen; a reformer adapted to reform the fuel containing hydrogen from the supplying source; an electric generator adapted to generate electricity by an electrochemical reaction between the reformed gas and an oxidant, wherein the reformer comprises a fuel reformer adapted to produce a reformed gas having hydrogen as a main component from the fuel containing hydrogen; a carbon monoxide (CO) remover adapted to remove carbon monoxide from the reformed gas; a heat source adapted to supply heat energy to the fuel reformer and the CO remover; and a moving unit adapted to move the heat source between the fuel reformer and the CO remover.

According to one embodiment of the invention, the supplying source includes a butane gas pressure container. Further, in one embodiment, the CO remover includes a shift reaction unit having a shift catalyst adapted to reduce concentration of carbon monoxide in the reformed gas by a water gas shift reaction, and a carbon monoxide (CO) oxidation unit having an oxidation catalyst adapted to selectively oxidize and remove carbon monoxide. Also, in one embodiment, the heat source moves toward the fuel reformer when the shift reaction unit is heated to have an activation temperature of the shift catalyst.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

In the following embodiments, a fuel containing hydrogen in which butane is a main component is described, but the present invention is not thereby limited. A portion of the fuel containing hydrogen is employed as a reforming fuel to be reformed and used with water, and another portion is employed as a combustion fuel for supplying heat energy to heat a reforming reaction unit and a carbon monoxide (CO) remover until they reach catalyst activation temperatures, respectively. Further, pure oxygen stored in a separate storage mechanism or air containing oxygen can be employed as an oxidant. Hereinafter, oxygen contained in external air will be described as the oxidant.

Figure 1:
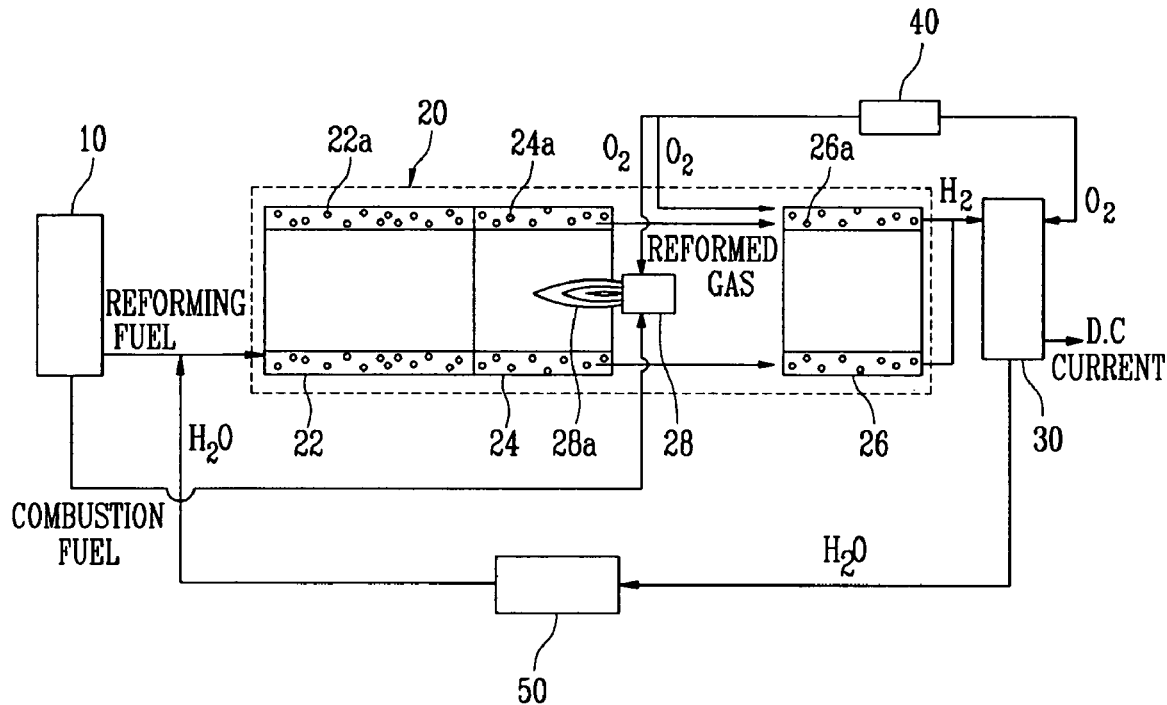
FIG. 1 is a schematic view of a fuel cell system having a fuel reforming system according to an embodiment of the present invention.

Referring to FIG. 1, a fuel cell system includes a supplying source 10 adapted to supply a fuel containing hydrogen having a butane base, a reformer 20 adapted to reform the fuel containing hydrogen from the supplying source 10 to produce a reformed gas (or hydrogen-rich gas), and a stack 30 adapted to generate electricity by an electrochemical reaction between hydrogen and an oxidant. Here, an air feeder 40 is adapted to supply the oxidant such as air to a heat source 28, a selective oxidation unit 26, and the stack 30. Further, a recovering tank 50 is adapted to recover water produced in the stack 30.

Figure 3:
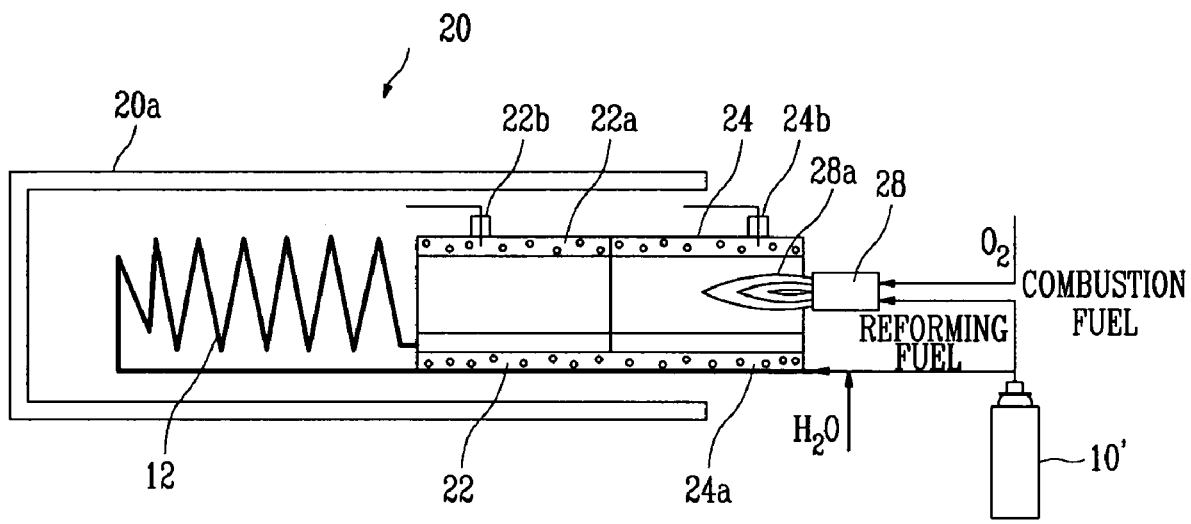
FIG. 3 is a schematic view of the fuel reforming system according to an embodiment of the present invention.

Referring also to FIG. 3, the supplying source 10 can include (or be) a universal butane gas pressure container 10'. In one embodiment as shown in FIG. 3, the supplying source 10 is coupled to (or includes) a vaporizer 12 adapted to vaporize butane supplied from the butane gas pressure container 10'. The vaporizer 12 vaporizes butane by decreasing pressure or by heat energy from the heat source 28 (to be described later in more detail).

The reformer 20 includes a reforming reaction unit (or fuel reformer or fuel reforming part) 22 adapted to produce the reformed gas having the hydrogen as a main component from the reforming fuel (or fuel containing hydrogen) supplied from the supplying source 10, a CO remover connected to communicate with the reforming reaction unit 22 and adapted to remove carbon monoxide from the reformed gas, and the heat source 28 adapted to supply heat energy to the reforming reaction unit 22 and the CO remover.

The reforming reaction unit 22 is supplied with a reforming catalyst 22a.

The reforming reaction unit 22 reforms the fuel containing hydrogen by a steam reforming (SR) method, an auto thermal reforming (ATR) method, a partial oxidation (POX) method, etc., but the present invention is not thereby limited. The partial oxidation method and the auto thermal reforming method have relatively good responding characteristics to initial start and load variation, but the steam reforming method has a relatively higher efficiency for producing hydrogen. The steam reforming method produces the reformed gas rich in hydrogen by a chemical reaction, i.e., an endothermic reaction between the fuel containing hydrogen and steam on a catalyst. Here, the steam reforming method should be used because the reformed gas is stably produced and relative high concentration of hydrogen is obtained even though it requires relatively more energy to perform the endothermic reaction. Therefore, in one embodiment, the steam reforming method is used. For example, in the case where the reforming reaction unit 22 employs the stream reforming method, a steam reforming reaction (refer to the following reaction formula 1) between the reforming fuel (i.e., the fuel containing hydrogen with a butane base) supplied from the supplying source 10 is performed on the reforming catalyst 22a, and the water generated on the reforming catalyst 22a is recovered by a recovering unit 50, thereby producing the reformed gas with abundant hydrogen.

$$\text{n-}C_4H_{10} + 8H_2O \leftrightarrow 4CO_2 + 13H_2 \quad \Delta H_{298} = 485.3 \text{ KJ/mol} \qquad \text{[Reaction formula 1]}$$

The reforming catalyst 22a can include a carrier supported with metal such as ruthenium, rhodium, nickel, etc. The carrier can include zirconium dioxide, alumina, silica gel, active alumina, titanium dioxide, zeolite, active carbon, etc. The foregoing reformed gas may include a slight amount of carbon dioxide, methane, and carbon monoxide. Particularly, carbon monoxide poisons a platinum catalyst that may be used for an electrode of the stack 30 and deteriorates the performance of the fuel cell system. Thus, carbon monoxide should be removed from the foregoing reformed gas.

To remove carbon monoxide, the CO remover includes a water gas shift unit 24 in which a water gas shift reaction is performed, and a selective oxidation unit 26 in which a selective oxidation catalyst reaction is performed. The water gas shift unit 24 is provided with a shift catalyst 24a, and the selective oxidation unit 26 is provided with an oxidation catalyst 26a. Further, an oxidant such as oxygen needed for a selective oxidizing reaction is supplied by the air feeder 40 to the selective oxidation unit 26. The water gas shift reaction and the selective oxidation catalyst reaction can be represented as the following reaction formulas 2 and 3, respectively.

$$CO + H_2O \leftrightarrow CO_2 + H_2 \ \Delta H_{298} = -41.1 \ KJ/mol \quad \text{[Reaction formula 2]}$$

$$CO + 1/2 O_2 \leftrightarrow CO_2 \ \Delta H_{298} = -284.1 \ KJ/mol \quad \text{[Reaction formula 3]}$$

In addition, the reformer 20 is provided with the heat source 28 using butane from the supplying source 10 as the combustion fuel. The heat source 28 is supplied with the oxidant such as oxygen from the air feeder 40. Here, the heat source 28 supplies heat energy needed for heating the reforming reaction unit 22, the water gas shift unit 24, and the selective oxidation unit 26 of the reformer 20 to reach catalyst activation temperatures, respectively.

Referring to FIG. 3, the reformer 20 includes a housing 20a formed with an accommodating space having a certain or predetermined size to accommodate the reforming reaction unit 22 and the water gas shift unit 24 therein, respectively. The heat source 28 is placed behind (or at a rear side of) the water gas shift unit 24, so that a flame 28a from the heat source 28 comes toward the accommodating space. In one embodiment, the vaporizer 12 is communicatably placed between the supplying source 10 (e.g., the butane gas pressure container 10') and the reforming reaction unit 22. The vaporizer 12 vaporizes the reforming fuel supplied from the butane gas pressure container 10'. In the heat source 28, the combustion reaction can be represented as the following reaction formula 4.

$$n\text{-}C_4H_{10} + 6.5 O_2 \ \Delta \ 4CO_2 + 5H_2O \ \Delta H_{298} = -2658.5 \ KJ/mol \quad \text{[Reaction formula 4]}$$

In more detail, a portion of the butane gas is supplied as the combustion fuel from the butane gas pressure container 10' to the heat source 28, and another portion of the butane gas is supplied as the reforming fuel to the vaporizer 12. Here, the heat source 28 is fed with oxygen from the air feeder 40, and the vaporizer 12 is supplied with water. Some of butane gas, i.e., the combustion fuel supplied to the heat source 28, is burned by the reaction based on the foregoing formula 4, and heat energy generated here is transferred to the reforming reaction unit 22 and the water gas shift unit 24. In one embodiment, the flame 28a from the heat source 28 contacts the water gas shift unit 24, thereby directly transferring the heat energy to the water gas shift unit 24.

Figure 2:
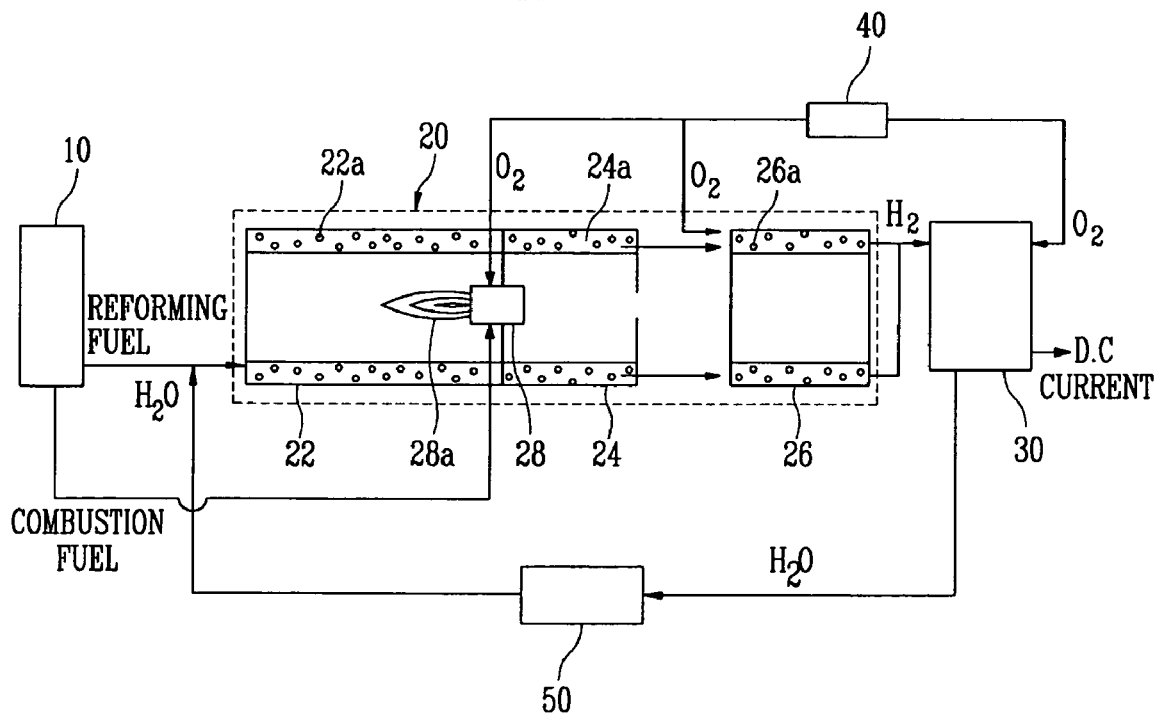
FIG. 2 illustrates a movable heat source in the fuel cell system of FIG. 1.
Figure 4:
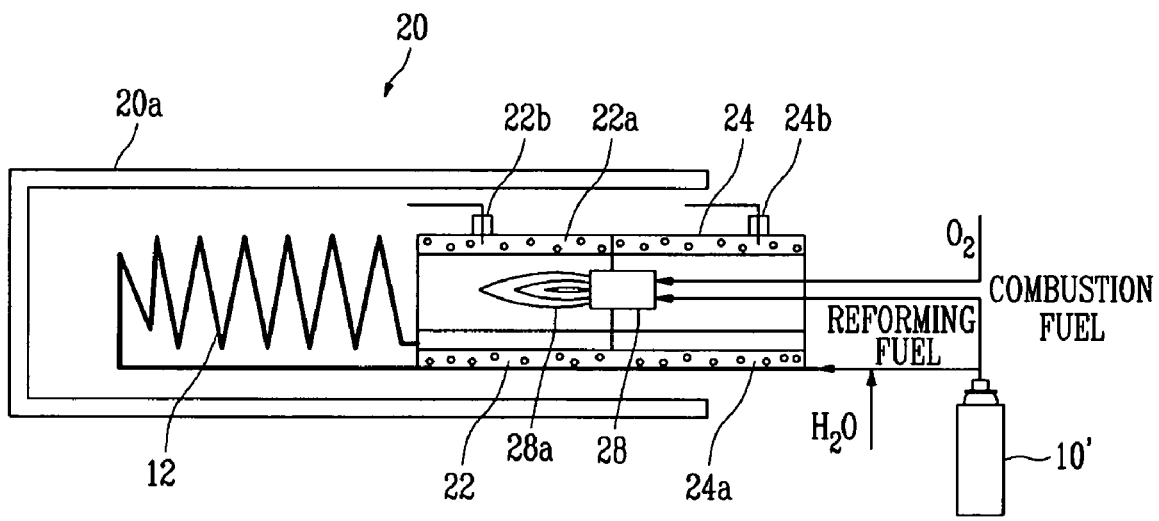
FIG. 4 illustrates the movable heat source in the fuel reforming system of FIG. 3.
Figure 5:
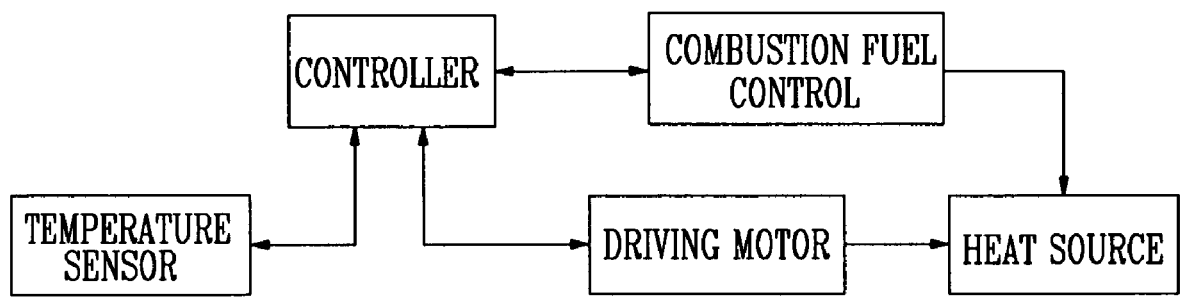
FIG. 5 is a block diagram of a driving unit for moving the heat source.
Figure 6:
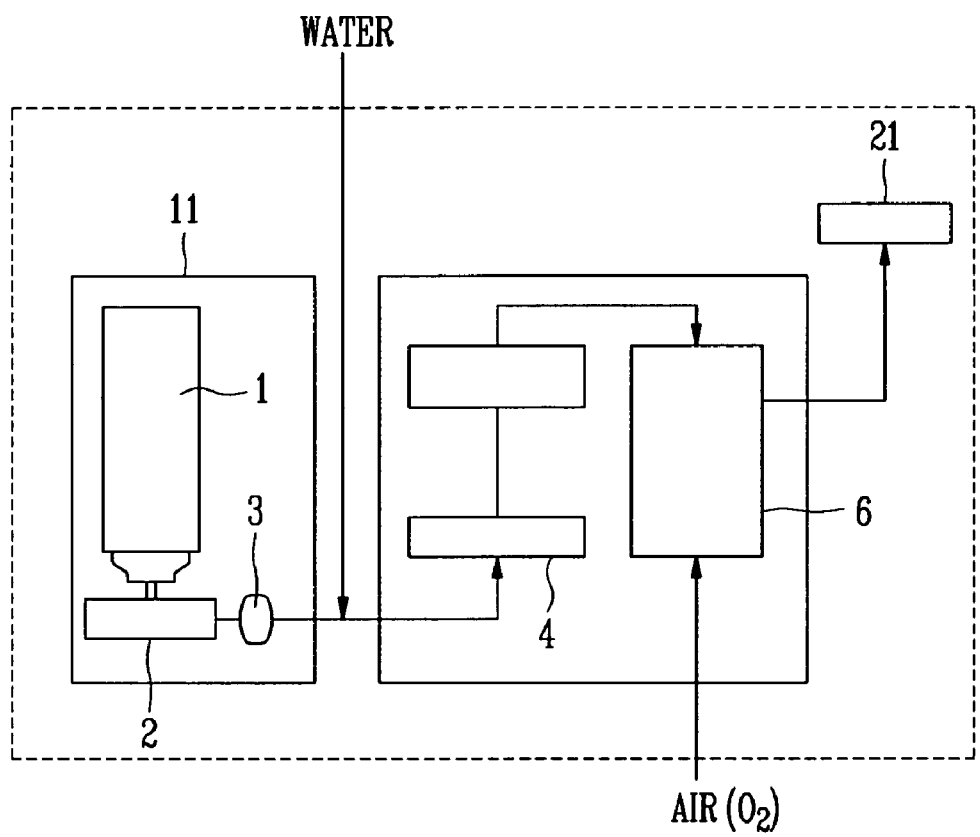
FIG. 6 illustrates a conventional fuel cell system.
Figure 7:
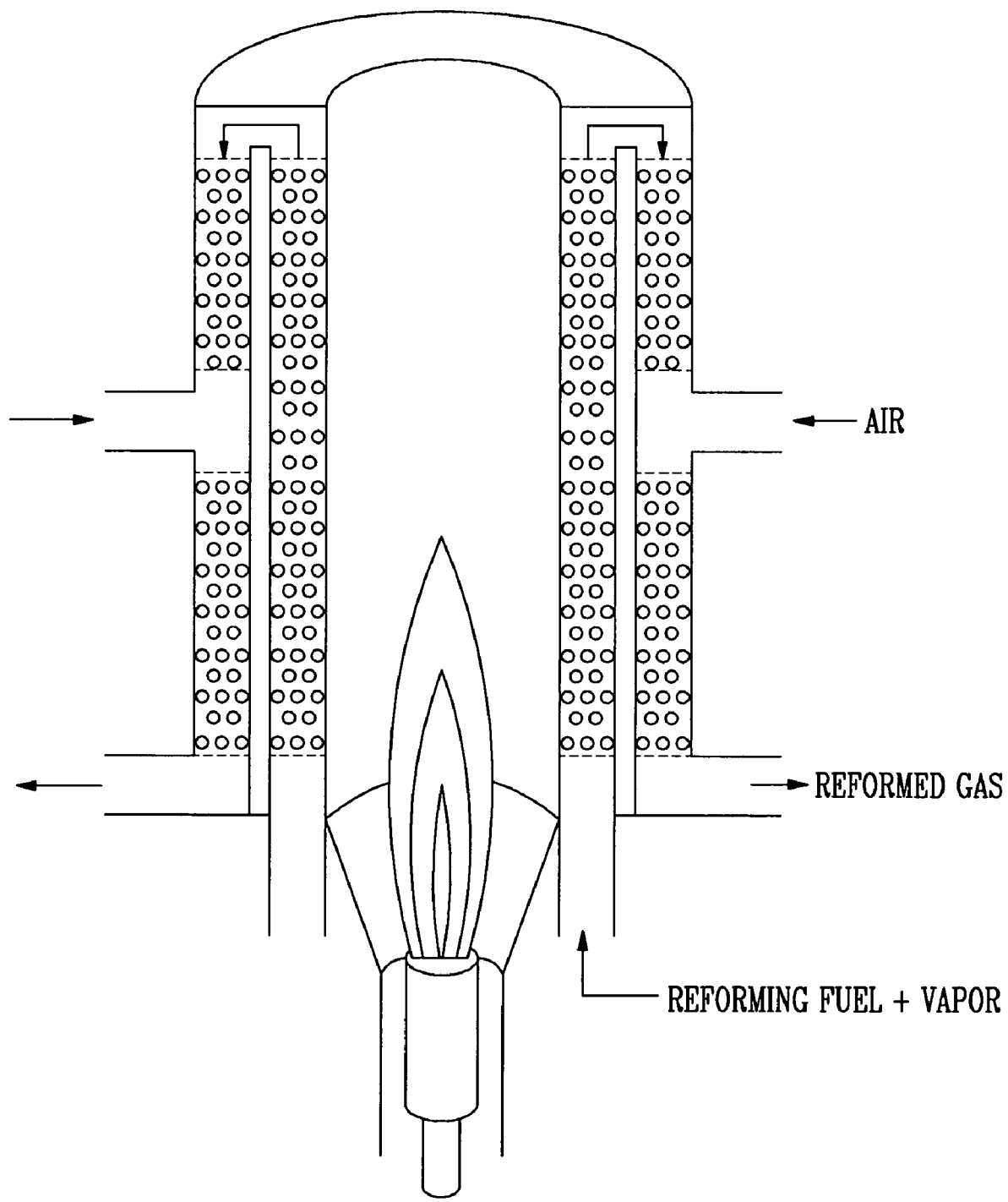
FIG. 7 illustrates a conventional reformer.

When the water gas shift unit 24 is heated to reach an activation temperature of the shift catalyst 24a (e.g., a copper-zinc catalyst) by the flame 28a of the heat source 28 and then the temperature of the water gas shift unit 24 is sensed by a temperature sensor (or a second temperature sensor) 24b, the second temperature sensor 24b provides a controller with information about the temperature of the water gas shift unit 24 as shown in FIG. 5. Then, as further shown in FIG. 5, the controller drives a driving motor to move the heat source 28 toward the reforming reaction unit 22 as shown in FIGS. 2 and 4. Thus, as shown in FIGS. 1 and 3, the water gas shift unit 24 is directly heated by the flame 28a of the heat source 28 to reduce a heating time taken to heat the water gas shift unit 24 until it reaches the activation temperature of the shift catalyst 24a.

Further, as shown in FIGS. 2 and 4, after the heat source 28 moves toward the reforming reaction unit 22, the flame 28a of the heat source 28 directly contacts and heats the reforming reaction unit 22. Here, a temperature sensor (or a first temperature sensor) 22b provided in the reforming reaction unit 22 senses the temperature of the reforming reaction unit 22 in real-time.

When the temperature of the reforming reaction unit 22 reaches the activation temperature of the reforming catalyst 22a, the first temperature sensor 22b provides the controller with this heated state, and thus the controller reduces an amount of the combustion fuel supplied (or reduces a supplying amount of the combustion fuel) to thereby decrease the size of the flame 28a from the heat source 28.

Also, the heat source 28 moves to the reforming reaction part 22, and the heated state of the water gas shift unit 24 is indirectly maintained by heat discharged back (or reflected back) along an inner wall of the housing 20a. Further, when the temperature of the water gas shift unit 24, sensed by the second temperature sensor 24b, is lower than the activation temperature of the shift catalyst 24a, the controller controls the driving motor to move the heat source 28 back toward the water gas shift unit 24.

In the state that the reforming reaction part 22 and the water gas shift unit 24 are heated by the heat source 28 up to the respective catalyst activation temperatures, the reforming fuel, i.e., the butane gas supplied from the butane gas pressure container 10', is vaporized together with water while passing through the vaporizer 12. Then, the vaporized reforming fuel is reacted based on the reaction formula 1 while passing through the reforming reaction unit 22, thereby producing the reformed gas rich in hydrogen (or the reformed gas with the hydrogen base).

While the reformed gas passes through the water gas shift unit 24, carbon monoxide is removed from the reformed gas by the reaction formula 2, thereby resulting in a first decrease of carbon monoxide contained in the reformed gas. To further decrease the amount of carbon monoxide contained in the reformed gas to an end concentration level, e.g., to at least 10 ppm or below, the selective oxidation unit 26 is connected to and communicates with the back of the water gas shift unit 24.

The selective oxidation unit 26 is provided with the oxidation catalyst 26a.

For example, the oxidation catalyst 26a includes a platinum catalyst or a ruthenium catalyst, and can have a solid form or a porous form. Thus, after passing through the water gas shift unit 24, more carbon monoxide is removed from the reformed gas by the reaction formula 3 while passing through the oxidation catalyst 26a of the selective oxidation unit 26, thereby producing a hydrogen-rich gas with approximately high hydrogen purity.

Referring to FIGS. 1 and 2, such hydrogen-rich gas is supplied to the stack 30. That is, when the hydrogen-rich gas and air are supplied to the anode electrode and the cathode electrode of the stack 30, electricity generated by the oxidation reaction of hydrogen is supplied to an external circuit through a collector (not shown).

In more detail, the high purity hydrogen produced from the selective oxidation unit 26 of the reformer 20 is supplied to the anode electrode (not shown) of the stack 30, and air containing oxygen is supplied from the air feeder 40 to the cathode electrode (not shown) of the stack 30. Further, as hydrogen ions are transferred via the MEA (not shown) of the stack 30, the electricity is generated by a chemical reaction between hydrogen and oxygen. Also, water produced based on the chemical reaction in the stack 30 is recovered to the recovering unit 50 and recycled.

According to an embodiment of the present invention, a fuel reforming part and a shift reaction part, which are used for obtaining reformed gas rich in hydrogen (i.e., with abundant hydrogen) from butane gas (and low in carbon monoxide), are directly heated by a heat source. Then, when the temperature of the shift reaction part reaches a catalyst activation temperature, the heat source is moved to directly heat only (e.g., is moved toward) the fuel reforming part, thereby enhancing a reforming effect of a fuel reforming system.

Further, according to an embodiment of the present invention, when a reaction region of the shift reaction unit is heated to have a catalyst activation temperature (or a predetermined catalyst activation temperature) while a reaction region of the fuel reforming part and the reaction region the shift reaction part are directly heated by heat energy from the heat source, the heat source is moved to directly heat only (or moved toward) the reaction region of the fuel reforming part, thereby enhancing the power generation efficiency of the fuel cell system.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A fuel reforming system comprising:
a fuel reformer adapted to produce a reformed gas having hydrogen as a main component from a fuel containing hydrogen;
a carbon monoxide (CO) remover adapted to remove carbon monoxide from the reformed gas;
a heat source adapted to generate heat energy and to supply the heat energy to the fuel reformer and the CO remover; and
a moving unit adapted to move the heat source between the fuel reformer and the CO remover.

2. The fuel reforming system according to claim 1, wherein the moving unit comprises a driving motor adapted to move the heat source, and a controller adapted to control operation of the driving motor.

3. The fuel reforming system according to claim 2, wherein the CO remover comprises a shift reaction unit having a shift catalyst adapted to reduce a concentration of carbon monoxide in the reformed gas by a water gas shift reaction, and a carbon monoxide (CO) oxidation unit having an oxidation catalyst adapted to selectively oxidize and remove carbon monoxide.

4. The fuel reforming system according to claim 3, further comprising a housing having an accommodating space adapted to accommodate the fuel reformer and the shift reaction unit.

5. The fuel reforming system according to claim 4, wherein the heat source is placed behind the shift reaction unit and orients a flame thereof toward the fuel reformer within the housing.

6. The fuel reforming system according to claim 5, wherein the heat source moves toward the fuel reformer when the shift reaction unit is heated to have an activation temperature of the shift catalyst.

7. The fuel reforming system according to claim 6, wherein the shift reaction unit is provided with a temperature sensor.

8. The fuel reforming system according to claim 5, wherein the accommodating space of the housing is provided with a vaporizer placed in front of the fuel reformer in a direction of the flame and vaporizes the fuel containing hydrogen.

9. The fuel reforming system according to claim 2, wherein the fuel reformer is provided with a temperature sensor.

10. The fuel reforming system according to claim 9, wherein the controller controls an amount of a combustion fuel to be supplied to the heat source.

11. The fuel reforming system according to claim 1, wherein the fuel containing hydrogen is supplied from a liquefied gas container.

12. A fuel cell system comprising:
a supplying source adapted to supply a fuel containing hydrogen;
a reformer adapted to reform the fuel containing hydrogen from the supplying source;
an electric generator adapted to generate electricity by an electrochemical reaction between a reformed gas and an oxidant,
wherein the reformer comprises a fuel reformer adapted to produce the reformed gas having hydrogen as a main component from the fuel containing hydrogen; a carbon monoxide (CO) remover adapted to remove carbon monoxide from the reformed gas; a heat source adapted to generate heat energy and to supply the heat energy to the fuel reformer and the CO remover; and a moving unit adapted to move the heat source between the fuel reformer and the CO remover.

13. The fuel cell system according to claim 12, wherein the moving unit comprises a driving motor adapted to move the heat source, and a controller adapted to control operation of the driving motor.

14. The fuel cell system according to claim 13, wherein the CO remover comprises a shift reaction unit having a shift catalyst adapted to reduce concentration of carbon monoxide in the reformed gas by a water gas shift reaction, and a carbon monoxide (CO) oxidation unit having an oxidation catalyst adapted to selectively oxidize and remove carbon monoxide.

15. The fuel cell system according to claim 14, further comprising a housing having an accommodating space adapted to accommodate the fuel reformer and the shift reaction unit.

16. The fuel cell system according to claim 15, wherein the heat source is placed behind the shift reaction unit and orients a flame thereof toward the fuel reformer within the housing.

17. The fuel cell system according to claim 16, wherein the heat source moves toward the fuel reformer when the shift reaction unit is heated to have an activation temperature of the shift catalyst.

18. The fuel cell system according to claim 17, wherein the shift reaction unit is provided with a temperature sensor.

19. The fuel cell system according to claim 16, wherein the accommodating space of the housing is provided with a vaporizer placed in front of the fuel reformer in a direction of the flame and vaporizes the fuel containing hydrogen.

20. The fuel cell system according to claim 13, wherein the fuel reformer is provided with a temperature sensor.

21. The fuel cell system according to claim 20, wherein the controller controls an amount of a combustion fuel to be supplied to the heat source.

22. The fuel cell system according to claim 12, wherein the supplying source comprises a liquefied gas container.

* * * * *